(12) United States Patent
Van Walraven

(10) Patent No.: US 8,215,593 B2
(45) Date of Patent: Jul. 10, 2012

(54) PIPE CLIP WITH VIBRATION-ISOLATING INSERT

(75) Inventor: Jan Van Walraven, Mijdrecht (NL)

(73) Assignee: J. Van Walraven Holding B.V., Mijdrecht (NL)

( * ) Notice: Subject to any disclaimer, the term of this patent is extended or adjusted under 35 U.S.C. 154(b) by 503 days.

(21) Appl. No.: 12/306,927

(22) PCT Filed: Jun. 26, 2007

(86) PCT No.: PCT/NL2007/000161
§ 371 (c)(1),
(2), (4) Date: Jul. 27, 2009

(87) PCT Pub. No.: WO2008/002129
PCT Pub. Date: Jan. 3, 2008

(65) Prior Publication Data
US 2009/0314904 A1 Dec. 24, 2009

(30) Foreign Application Priority Data
Jun. 27, 2006 (NL) .................................. 1032064

(51) Int. Cl.
*F16L 3/08* (2006.01)
(52) U.S. Cl. .................... 248/74.1; 248/60; 248/74.3
(58) Field of Classification Search .............. 248/74.1, 248/74.3, 60
See application file for complete search history.

(56) References Cited

U.S. PATENT DOCUMENTS

| 2,387,295 A * | 10/1945 | Robertson ..................... 248/74.3 |
| 2,922,733 A | 1/1960 | Henning |
| 2,982,505 A * | 5/1961 | Shy ............................... 248/74.3 |
| 3,159,708 A | 12/1964 | Deal |
| 3,165,793 A | 1/1965 | Lynch |
| 3,419,458 A | 12/1968 | Charles et al. |
| 3,706,173 A | 12/1972 | Taylor |
| 4,318,518 A | 3/1982 | Davis |
| 4,441,677 A * | 4/1984 | Byerly ......................... 248/74.3 |
| 4,749,203 A | 6/1988 | Bright |
| 5,722,131 A | 3/1998 | Leistner |

FOREIGN PATENT DOCUMENTS

| DE | 7732253 U1 | 5/1978 |
| GB | 1115527 A | 5/1968 |
| GB | 1179187 A | 1/1970 |
| GB | 2181698 A | 4/1987 |

* cited by examiner

*Primary Examiner* — Anita M King
(74) *Attorney, Agent, or Firm* — Browdy and Neimark, PLLC

(57) ABSTRACT

A pipe clip comprises an annular pipe clip body made from a metal strip for accommodating a pipe in order to attach the latter to a wall, ceiling or other support. Vibration-isolating material is applied to the pipe clip body, at least on that side which, in use, faces the pipe. The viewed in the width direction of the metal strip, outermost regions, are coated with a vibration-isolating material, at least on that side which, in use, faces the pipe. A central region of the metal strip situated between the outermost regions is uncoated on the side facing the pipe and the side facing away from the pipe.

32 Claims, 2 Drawing Sheets

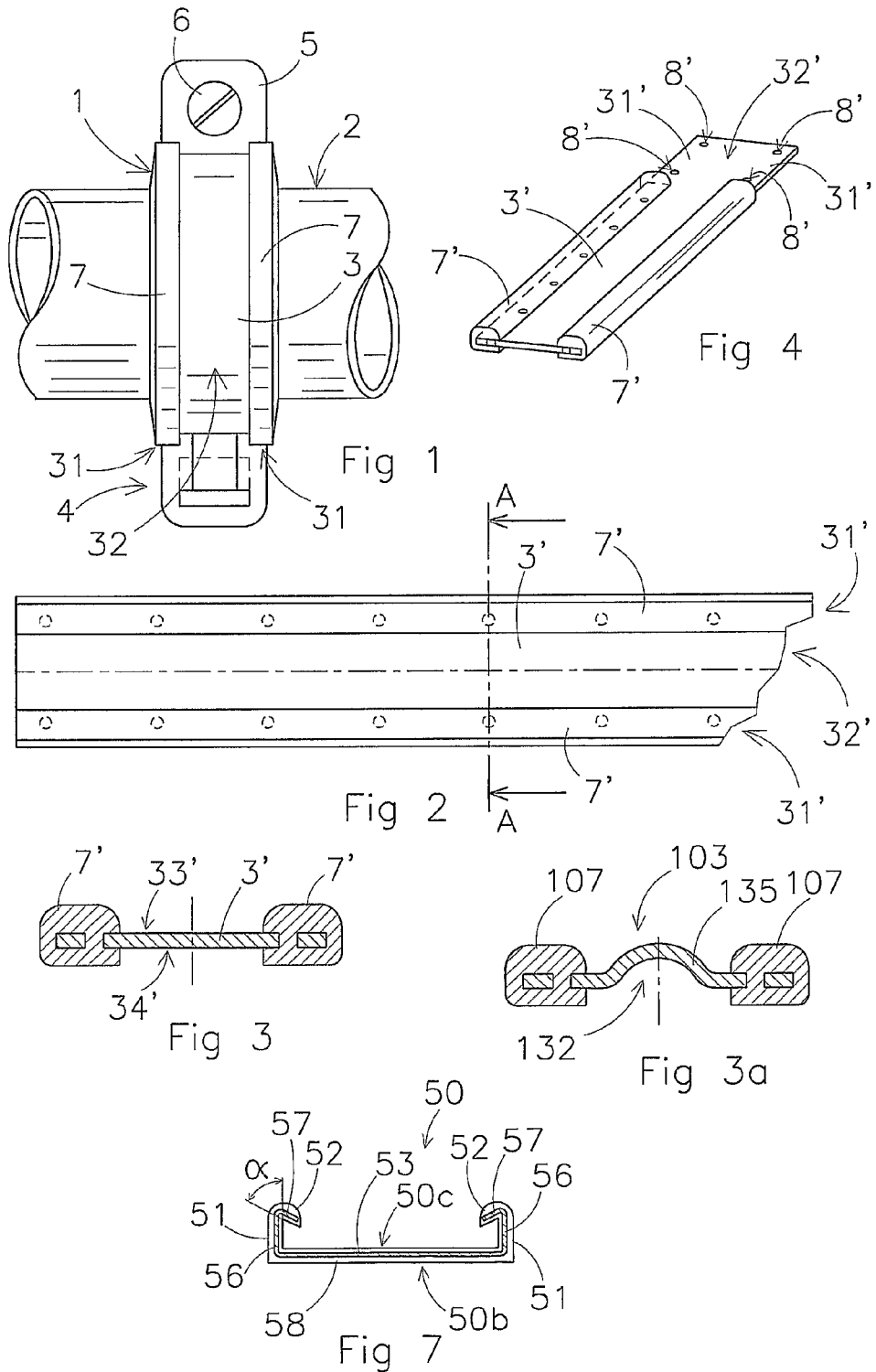

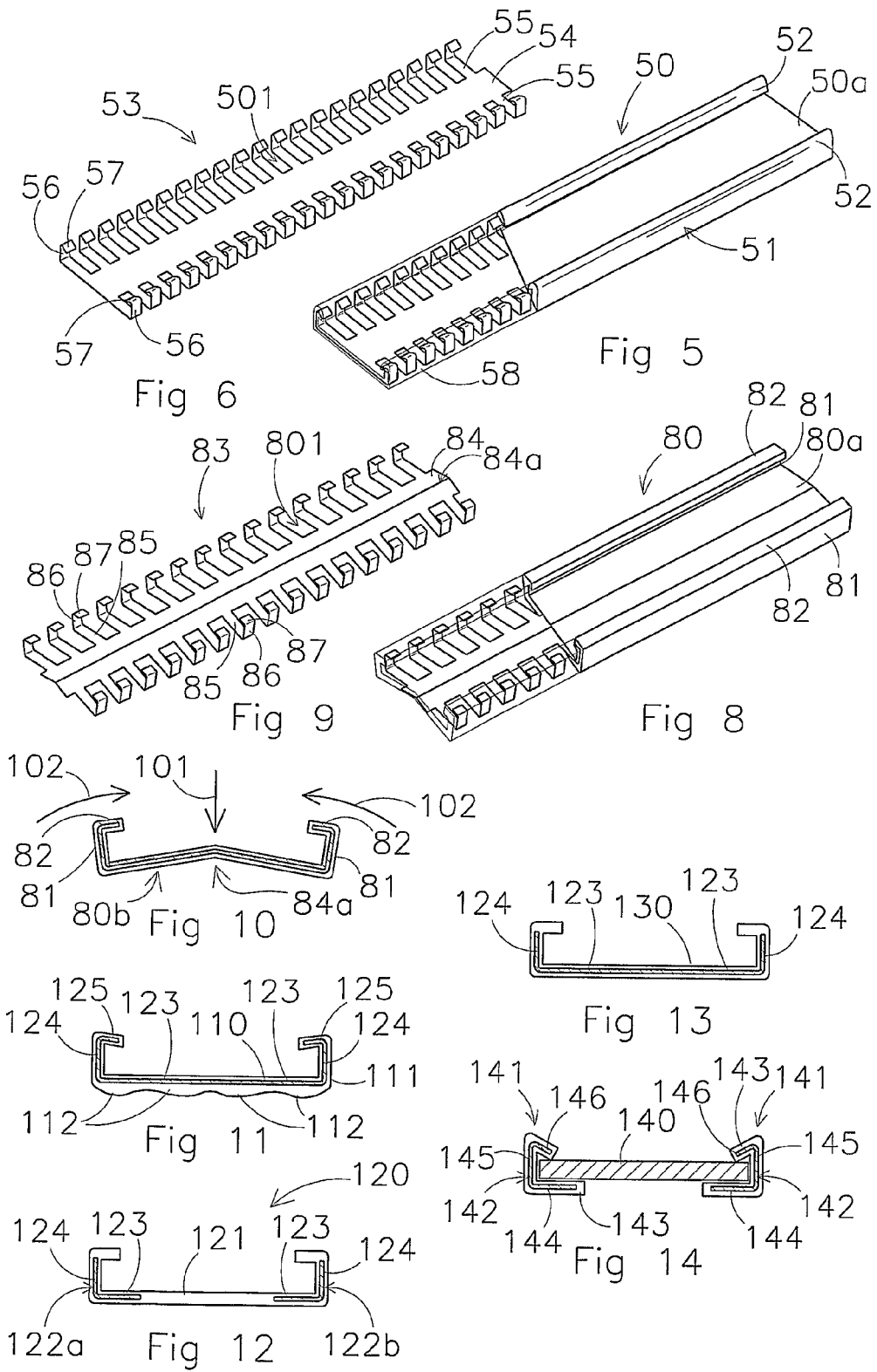

PIPE CLIP WITH VIBRATION-ISOLATING INSERT

The invention relates to a pipe clip for accommodating a pipe in order to attach the latter to a wall, ceiling or other support, in which vibration-isolating material is applied to the pipe clip, at least on that side which, in use, faces the pipe.

Such pipe clips are known. EP-A-975908, for example, describes a pipe clip with a pipe clip body comprising two clip halves. Each of the clip halves is made from a strip of metal which has been bent to form a semicircular shape. At one end of each of the clip halves a hinge means is integrally formed for hingedly coupling the clip halves in such a manner that the clip body can be opened by means of the hinge and fitted around a pipe. At the other end of each of the clip halves, a coupling flange is arranged for fastening the pipe clip body by means of a tightening screw after it has been fitted around the pipe. The pipe clip body is provided with a sound-insulating insert on the inside. The sound-insulating insert is formed by a C-shaped rubber profiled section which grips around the pipe clip body.

In the case of such a pipe clip, the loose C-shaped rubber profiled section is fitted around the pipe clip body from the inside by hand during production, after the pipe clip halves have been formed and have been coupled to one another in order to form a pipe clip body. This is very labour-intensive and expensive. Furthermore, it is possible that the insert is pulled out of the clip body by an axial movement of the pipe despite the C-shape of the known rubber profiled section gripping around the clip halves.

It is an object of the invention to provide an improved pipe clip.

This object is achieved according to the invention with a pipe clip according to the preamble of claim 1, characterized by the fact that on the, viewed in the width direction of the metal strip, outermost regions, a vibration-isolating material is applied to the metal strip, at least on that side which, in use, faces the pipe, and that a central region of the metal strip situated between the outermost regions lies bare on the side facing the pipe and the side facing away from the pipe.

Such a pipe clip can be produced by applying the vibration-isolating material to the outermost regions of the metal strip by means of a continuous process and then cutting the metal strip coated in this manner to the desired length. The central region of the strip which remains uncoated then makes it possible to bend or press the clip body into the desired shape by means of, for example, a bending machine. Thus, a pipe clip is provided which can be produced entirely automatically by machine, which, in operational terms, is efficient and results in a cost saving.

According to a preferred embodiment, the vibration-isolating material is applied to the metal strip by means of extrusion. The metal strip, which is, for example, unwound from a reel, is passed through an extruding machine, where a vibration-isolating coating is applied to the outermost regions of the metal strip in a continuous process.

Preferably, recesses or openings are provided in the metal strip at regular intervals along the length of the outermost regions of the metal strip, which recesses or openings are filled with vibration-isolating material. During production, the vibration-isolating material, for example rubber, is applied to the metal strip in a liquid or kneadable state, with the material flowing into the recesses or openings, preferably holes. As a result, a strong connection between the layer and the metal strip is produced. Such a connection between a vibration-isolating layer and a metal strip is known per se from GB 1 173 913, which shows a drop hanger to which a pipe can be attached. The known drop hanger is made from a metal strip which is completely coated on both sides with a layer of rubber or a layer of synthetic elastomeric material which is connected to the strip. The purpose of the coating is to absorb vibrations which occur in the pipe. Before being coated, the metal strip is provided with a series of holes or indentations into which the coating material can flow when it is in a liquid state, which, once the coating material has cured, results in the coating remaining in contact with the sides of the metal strip and the coating being prevented from sliding off the strip. The drop hanger is supplied as a flat hanger and is cut by the user to the desired length and fitted around the pipe. In order to be able to bend the initially flat hanger around the pipe, this hanger can only have a limited thickness. The loop of the hanger which is fitted around the pipe is fastened by means of a bolt which is introduced through an opening in the hanger. The other end of the drop hanger is likewise attached to a support by means of a bolt which is introduced through an opening in the hanger. Such a drop hanger can readily be completely coated. However, for pipe clips of the kind mentioned in the preamble, i.e. with a preformed pipe clip body, a complete coating with rubber or the like is disadvantageous, as the rubber layer makes it difficult, or completely impossible, to bend the clip body to the desired shape. Furthermore, the rubber layer would be damaged by the stamps of the bending machine.

According to another embodiment, the coating layer is bonded to the metal strip. This may be effected by applying a vibration-isolating layer by means of coextrusion or another method and applying an adhesive layer between the vibration-isolating layer and the metal.

Preferably, a nut is provided on the outer side of the clip body in the central region. As the central region is free from rubber or the like, the nut can be welded, riveted or affixed in another way directly onto the clip body without having to remove rubber. The nut serves for enabling the clip to be screwed onto a threaded rod provided on a support element.

According to another preferred embodiment, one or more reinforcing ridges are formed in the central region of the pipe clip body. The starting material for the clip body is a flat metal strip. In order to increase the stiffness of the clip body, ridges are pressed into the latter. Thus, the central region may, for example be designed to curve outwards, while the outermost regions are flat. Here again, it is advantageous that the central region is not coated, as the reinforcing ridges could not be pressed into the metal strip if this were coated with rubber or the like.

The invention furthermore relates to a method for producing a pipe clip. According to this method, metal strip material is unwound from a reel and is provided on, viewed in the width direction of the strip, outermost regions with a sound-insulating coating. Then, the metal strip material is cut to a length in order to form a metal strip which is suitable for forming a pipe clip body.

Preferably, the ends of the cut metal strip are cleared of coating material, at least on one side. The metal strip is then formed into a clip body or a clip part by means of a press device, with the strip being bent to form a clip body or a clip part, and with the ends of the metal strip which have been cleared of coating material being formed into a flange or a hinge part.

A second aspect of the invention relates to a vibration-isolating element to be provided on a pipe clip body of a pipe clip for attaching a pipe to a wall, ceiling or other support.

Such a vibration-isolating element is known from EP-A-975908. The known vibration-isolating element is completely made from rubber.

It is an object of the invention according to the second aspect to provide an alternative for the known vibration-isolating element.

According to the second aspect of the invention, this object is achieved by a vibration-isolating element of the abovementioned kind, characterized by the fact that the vibration-isolating element comprises an angled metal reinforcing profiled section, which reinforcing profiled section comprises a first leg which, in the fitted position, extends substantially parallel to the pipe clip body, as well as a second leg which, in the fitted position, extends along the edge of the clip body, with a vibration-isolating layer being applied to the first leg of the metal reinforcement part, at least on the side which is to face the pipe.

In use, the first leg of the metal profiled section of the vibration-isolating element is applied to the inside of a pipe clip body. The second leg extends along the edge of the pipe clip body and prevents the vibration-isolating layer from sliding out of the clip body due to an axial load on the pipe.

Preferably, the vibration-isolating element comprises two angled metal reinforcing profiled sections which are located opposite one another and connected to one another and in which, in the fitted position, each of the second legs of the angled profiled sections extends along one of the edges of the clip body. In this manner, the vibration-isolating element is, at least in the axial direction, held securely around the pipe clip body and it is more readily ensured that the vibration-isolating element cannot slide out of the clip body as a result of an axial load on the pipe.

The angled metal reinforcing profiled sections may be connected to one another by vibration-isolating material or via a metal connecting piece. In the latter case, the angled metal reinforcing profiled sections as well as the metal connecting piece are preferably produced in one piece, with the angled metal profiled sections and the metal connecting piece together forming a substantially U-shaped profiled section. The angled metal profiled sections and the metal connecting piece may also form a C-shaped profiled section, with each of the angled metal profiled sections comprising a third leg which extends from the free end of the second leg in substantially the same direction as the first leg in order to grip around the respective edge of the pipe clip body in the fitted position.

In a further preferred embodiment, openings are provided on both sides at a distance from one another along the length of the reinforcing profiled sections, which openings extend from the side towards the centre at a distance from the centre in such a manner that the metal connecting piece forms a central metal strip with arms extending in the transverse direction which are provided with an upright part at the end that is remote from the central strip. This embodiment has the advantage that the metal profiled section, due to the described shape, can readily be wound onto a reel or the like, as a result of which it can then be conveyed to a device relatively easily and can be supplied in order to be coated with rubber or the like.

In another embodiment, in which the abovementioned openings are not provided in the metal, preferably U-shaped or C-shaped, profiled section, the metal profiled section cannot as readily be wound onto a reel, but is simpler to produce.

In another preferred embodiment, in a position prior to fitting to the pipe clip body, the connecting piece is bent upwards in the middle, in such a manner that the second legs of the angled profiled sections are turned slightly outwardly, so that there is a distance between opposite free ends of the two legs, or, if present, inwardly directed third legs, which distance is greater than the width of the pipe clip body, and in such a manner that if the central connecting piece is pressed flat against the pipe clip body during fitting, the second legs swing inwards, as a result of which the second legs retain the pipe clip body in the axial direction and any third legs grip around the side edges of the pipe clip body. By lightly pressing the insert against the inside of the pipe clip body during fitting, the second legs can tilt inwards and clip against the edges of the clip body. The third legs, if present, can furthermore grip around the clip body as grip rims. Thus, this measure advantageously creates the possibility of providing the vibration-isolating element in the clip body in an automated way.

In another preferred embodiment, the third legs of the angled metal profiled sections extend at an acute angle with respect to the second legs. As a result, the vibrating-isolating element with the third legs, which are optionally coated with rubber or the like, can be placed against the inside of the pipe clip body and then be pushed through. Due to the pressure of the edges of the pipe clip body, the third legs will bend away and form an even more acute angle until the pipe clip body can pass. The third legs then bend back and grip around the edges of the pipe clip body. This measure advantageously creates the possibility of providing the vibration-isolating element in the clip body in an automated manner.

In one preferred embodiment of the vibration-isolating element, the vibration-isolating material is extruded onto the metal profiled section.

Preferably, the metal profiled section is completely embedded in vibration-isolating material.

The second aspect of the invention furthermore relates to a method for producing a vibration-isolating element Furthermore, the second aspect of the invention relates to a method for producing a pipe clip provided with a vibration-isolating element.

Preferred embodiments of both aspects of the invention are defined in the dependent claims.

The invention will be explained in more detail below with reference to the drawing, in which:

FIG. 1 shows a bottom view of a preferred embodiment of a pipe clip according to a first aspect of the invention, which is fitted around a pipe, FIG. 2 shows a top view of a strip for forming the pipe clip from FIG. 1, FIG. 3 shows a sectional view along line A-A of the strip from FIG. 2, FIG. 3a shows a sectional view of a pipe clip half with a reinforcing ridge, FIG. 4 shows a perspective view of the strip from FIG. 2, FIG. 5 shows a partially cut-away perspective view of a preferred embodiment of a vibration-isolating element according to a second aspect of the invention, FIG. 6 shows a metal reinforcement core of the vibration-isolating element from FIG. 5, FIG. 7 shows a sectional view of the vibration-isolating element from FIG. 5, FIG. 8 shows a partially cut-away perspective view of another preferred embodiment of a vibration-isolating element according to a second aspect according to the invention, FIG. 9 shows a metal reinforcement core of the vibration-isolating element from FIG. 8, FIG. 10 shows a sectional view of the vibration-isolating element from FIG. 8, FIG. 11 shows a sectional view of a variant embodiment of the vibration-isolating element from FIG. 5, FIG. 12 shows a sectional view of a variant embodiment of a vibration-isolating element according to the invention, FIG. 13 shows a sectional view of another variant embodiment of a vibration-isolating element according to the invention, and FIG. 14 shows a sectional view of a pipe clip body which has two vibration-isolating elements according to an embodiment of the invention provided near its edges.

The invention relates to pipe clips, in particular pipe clips of the kind having a preformed, substantially circular pipe clip body, unlike the drop hanger, for example, disclosed in GB 1173913, which is initially flat and is only formed into a loop while being fitted around the pipe. Compared to preformed clip bodies, such a drop hanger can generally have only a limited thickness as the hanger still has to be deformed during fitting by the fitter. As a result of this limited thickness, a drop hanger is less strong and has a lower load-bearing capacity than preformed clip bodies. Due to the limited thickness of the known drop hanger, it is furthermore, for example, not possible either to tap threaded holes into the latter, and, as GB 1173913 also shows, a bolt/nut combination is required in order to keep the loop which has been produced closed. In this case, the rubber which is present on the hanger also makes it more difficult to securely clip the loop by means of the bolt/nut combination. Preformed pipe clips are generally relatively thick and can be tapped with threaded holes, into which a tightening screw can be screwed in order to tighten the clip around the pipe. In light of the above, the kind of pipe clip having a preformed pipe clip body is preferable to a drop hanger in many applications due to the generally more simple fitting and the greater strength and stability of the clip.

FIG. 1 shows a bottom view of a pipe clip 1 of the type having a preformed pipe clip body which is fitted around a pipe 2. The illustrated pipe clip 1 has a circular pipe clip body which comprises two semicircular pipe clip halves 3. In the figure, only the bottom clip half 3 is visible. Each clip half 3 has a hinge means 4 at one end and a coupling flange 5 at the other end. The pipe clip halves 3 are hingedly coupled to one another by means of the respective hinge means 4. During fitting, the clip body is opened by means of the hinge and fitted around the pipe 2. The coupling flanges 5 are then coupled to one another by means of a tightening screw 6 or another tightening means and the pipe clip 1 is secured around the pipe 2 by tightening the tightening screw 6. This is a pipe clip construction which is known per se and which is used by way of example. According to the invention, it is also possible to produce pipe clips having a pipe clip body produced in one piece, i.e. without hinge means. A pipe clip body without tightening flanges, but with other tightening means, is likewise conceivable.

The pipe clip halves 3 of the pipe clip 1 are produced by bending a metal strip by means of a bending machine in a manner known per se to form a semicircular shape. The hinge means 4 and the flange 5 are also formed in a manner known per se by means of punching and bending.

FIGS. 2-4 show a flat metal starting strip 3' from which the pipe clip half 3 is formed. On both sides, the metal strip 3' is coated on the, viewed in the width direction, outermost regions 31' with a vibration-isolating coating 7' of, for example, rubber or another elastomeric material. The vibration-isolating coating 7' is applied to the metal strip 3' by passing the latter through an extrusion machine where liquid rubber or another vibration-isolating material is extruded onto the strip 3'. The outermost regions 31' of the metal strip 3' are provided with holes 8' which are arranged at a distance from one another in the longitudinal direction. When the coating layer 7' is extruded on, coating material is only applied to the outermost regions 31' and the central region 32' located between the outermost regions 31' remains uncoated.

The coating layer 7' is preferably thicker on that side 33' of the strip 3' which, in use, faces the pipe than on the opposite side 34', as can clearly be seen in FIG. 3. It is also possible to provide the vibration-isolating material on the side 33' that is to face the pipe with longitudinal ridges (not shown) or the like to ensure better absorption of vibrations.

During the extrusion, the liquid coating material which is applied to that side 33' which, in use, is to face the pipe, and to the opposite side 34' of the strip 3', will flow through the holes 8' and, after solidification, form a connection between the coating material which is on both sides 33' and 34' of the metal strip 3'. As a result, the coating 7' is fixedly connected to the metal strip 3'.

The metal strip 3', with the vibration-isolating coating 7' which has been extruded thereon, is preferably wound onto a reel again. Subsequently, the metal strip can be unwound again at another production location and cut to a specific length. The length of the cut metal strip is such that a clip half can be formed from it which is suitable for accommodating a pipe of a certain outer diameter.

The ends of the cut metal strip 3' can be cleared of coating material at both ends. The ends of the metal strip which have been cleared of coating material are formed into a flange 5 and a hinge part 4 of the clip half 3 to be formed. Then, the metal strip 3', which is still flat, is formed into the clip half 3 by means of a press device, with the strip 3' being bent into a semicircular shape. When forming the pipe clip half, one or more reinforcement ridges may be formed in the central region 32 of the pipe clip body 3. FIG. 3a shows a cross section of a pipe clip half 103, with vibration isolating material 107 on the outermost regions, and in which the central region 132 is curved outwards, resulting in a relatively wide single reinforcement ridge 135. It is also possible to form several narrow ridges in the central region (not shown). The reinforcement ridges impart stiffness to the clip half 103.

Thus, a pipe clip half 3 is obtained in which the outermost regions 31 are coated with vibration-isolating material 7 on that side which, in use, faces the pipe 2 and on the side facing away from the pipe 2. The pipe clip halves 3 can then be joined together and coupled to one another by means of their respective hinge means 4.

A nut (not shown) can be welded, riveted or affixed in another way to the central region 32 of the top clip half. Affixing the nut can be carried out in a manner known per se in an automatic machine. It must be possible to screw the nut around the pipe clip 1 onto a threaded end provided on a ceiling or another support surface. The width of the central region 32' is preferably chosen in such a manner that a nut can be provided thereon.

As has already been mentioned above, the pipe clip according to the invention is not necessarily constructed in the manner described. Thus, it is conceivable to produce the clip body in one piece with a coupling flange at both ends. A clip with more than two clip parts would also be conceivable.

Furthermore, other ways can be conceived in which the vibration-isolating coating can be applied to the metal strip. Thus, it is possible to extrude the vibration-isolating coating onto the metal strip without holes having been made in the metal strip. The layer is then connected to the metal, for example, by vulcanization. Furthermore, it is conceivable to apply an adhesive layer and a vibration-isolating layer onto the metal strip by means of a coextrusion process, in which the adhesive layer bonds the metal and the rubber to one another. It is also possible to apply strips of vibration-isolating material which have already been extruded beforehand onto the metal strip after an adhesive layer has been applied.

FIG. 12 shows an embodiment of a vibration-isolating element 120 to be fitted into a pipe clip body. The element 120 comprises a rubber profiled section 121 with an L-shaped angled metal reinforcing profiled section 122a, 122b embedded therein on each side. Each reinforcing profiled section 122a, 122b has a first leg 123 which, in the fitted position, extends substantially parallel to the pipe clip body, as well as a second leg 124 which, in the fitted position, extends along the edge of the clip body. The L-shaped metal profiled sections 122a, 122b shown in FIG. 12 are connected to one another by means of the rubber material into which they are embedded.

In a further preferred embodiment, the angled profiled sections can be connected to one another by their first legs 123 via a metal connecting piece. Preferably, the angled profiled sections and the metal connecting piece are produced in one piece, so that in fact one metal profiled section 130 is formed having, for example, a U-shape, as is illustrated in FIG. 13. It is also possible for two angled metal reinforcing profiled sections having a first leg 123, a second leg 124 and a third leg 125 to be connected to one another by their first legs 123 at the sides, so that in fact one substantially C-shaped metal profiled section 110 is created, as is illustrated in FIG. 11.

FIG. 5 shows a particular preferred embodiment of a vibration-isolating element 50 which is designed to be fitted between a pipe and a pipe clip body. The vibration-isolating element 50 comprises a rubber profiled section with an insert 50a and raised edges 51 on both sides, at the end of which there are inwardly directed gripping edges 52 which grip around side edges of the pipe clip body. Each gripping edge 52 of the profiled section encloses an acute angle $\alpha$ with the adjoining raised edge 51. The vibration-isolating element 50 has a substantially C-shaped metal reinforcing profiled section 53 (see FIG. 7) which is embedded in the rubber profiled section. The metal reinforcing profiled section is preferably made from a metal strip which may have a thickness of 0.2-2.5 mm, but will, in practice, usually have a thickness of 0.2-0.8 mm.

As illustrated in FIG. 6, the metal profiled section 53 comprises a substantially flat central strip 54. Extending from the central strip 54, arms 55 are provided on both sides thereof, arranged at a distance from one another over the length thereof, which extend from the central strip 54 in the transverse direction and, analogously to the description above with reference to FIGS. 11-13, form the first legs of an angled profiled section. At the end facing away from the central strip 54, the arms 55 are provided with an upright part 56 which forms the second leg of the angled profiled section. The upright part 56 is in turn provided at its free end with an inwardly directed gripping projection 57 which forms the third leg of the angled profiled section. The gripping projection 57 encloses an acute angle $\alpha$ (see FIG. 7) with the upright part 56. The metal profiled section 53 formed in this way and having openings 501 between the arms 55, upright parts 56 and gripping projections 57 has the advantage that it can be rolled up so that it can then be more easily transported to an extrusion device or another device in order to be coated with rubber or the like.

The vibration-isolating profiled section is preferably formed by extrusion of, for example, rubber or another elastomeric material. During the extrusion, the metal profiled section 53 is passed through the extrusion device in such a manner that this profiled section 53 is completely embedded in the vibration-isolating material 58, as can clearly be seen in FIG. 6 and FIG. 7. The openings 501 between the arms 55, the upright parts 56 and the gripping projections 57 are in this case filled with rubber or another elastomeric material, as can be seen in FIG. 5.

In one variant embodiment, it is possible to coat only the insert section 50a with rubber or another vibration-isolating material and to leave the upright parts 56 and the gripping projections 57 uncoated. In this case, the insert section 50a, in a similar way to that shown in FIG. 7, can be coated on both sides with rubber, with the layer thickness of the rubber on that side 50b which, in use, faces the pipe preferably being thicker than that of the side 50c which, in use, faces the clip body. It is also possible to coat only that side 50b of the insert section 50a which, in use, faces the pipe and to leave that side which, in use, faces the clip body uncoated.

In another variant, it is possible not to form the metal core as illustrated in FIG. 6, but without openings 501 as a substantially C-shaped metal profiled section comprising a metal strip with a raised edge on both sides. The raised edge on the free end is provided with an inwardly directed gripping edge. The gripping edge in this case preferably encloses an acute angle with the raised edge. This substantially C-shaped metal profiled section is provided, at least on that side which, in use, faces the pipe, with a layer of vibration-isolating material. Preferably, the profiled section is passed through an extrusion device and completely coated with sound-insulating material. The cross section of such a profiled section is identical to that shown in FIG. 7.

As the gripping edges 52 of the profiled section extend at an acute angle with respect to the raised edges 51, these gripping edges 52 can be pushed away during fitting of the profiled section 50 on account of the pressure from the edges of the pipe clip body so that the clip body can pass and be introduced into the profiled section from that side. After the pipe clip body has passed the gripping edges 52, the latter bend back into their normal position and grip around the edge of the pipe clip body. This operation can be carried out by machine in a simple manner and can thus be automated.

FIG. 8 shows another preferred embodiment of a vibration-isolating element. According to this embodiment, the vibration-isolating element 80 comprises a profiled section with an insert 80a and raised edges 81 on both sides, at the end of which are inwardly directed gripping edges 82 which grip around side edges of the pipe clip body in the fitted position. Each gripping edge 82 of the profiled section extends at approximately right angles to the adjoining raised edge 81. The vibration-isolating element 80 has a metal reinforcing profiled section 83 which is preferably made from a metal strip having a thickness of 0.2-2.5 mm, but will in practice usually have a thickness of between 0.2-0.8 mm.

As shown in FIG. 9, the metal profiled section 83 comprises a central strip 84 which is bent upwards in the middle. The bending line is denoted by reference numeral 84a. Extending from the central strip 84, arms 85 are provided on both sides thereof, arranged at a distance from one another over the length thereof, which extend from the central strip 84 in the transverse direction. At the end facing away from the central strip 84, the arms 85 are provided with an upright part 86, which upright part 86 is in turn provided at its free end with an inwardly directed gripping projection 87. The gripping projection 87 extends at substantially right angles to the upright part 86.

The vibration-isolating profiled section 80 is preferably formed by extruding, for example, rubber or another elastomeric material. This preferably takes place in the same manner as described with reference to the embodiment shown in FIG. 5.

As the central strip 84, prior to being fitted to the pipe clip body, is bent upwards in the middle, the raised edges 81 point slightly outwards, as can best be seen in the cross section of FIG. 10. As a result, there is a distance between the opposite inwardly directed gripping edges 82 which is greater that the width of the pipe clip body. When the central strip 84 is pressed flat against the pipe clip body during fitting, which is indicated by arrow 101, the raised edges 81 swing inwards, which is indicated by arrows 102. As a result of the raised edges swinging inwards, the gripping edges 82 then grip around the side edges of the pipe clip body. Preferably, the upright parts clip against the edge of the clip body.

The vibration-isolating element 80 (see FIG. 8) which is bent in the middle prior to being fitted to the pipe clip body can advantageously be introduced into the pipe clip by machine and in an automated manner by simply pressing the bending line against the pipe clip body. The above-described swinging mechanism then causes the gripping edges 82 to grip around the pipe clip body.

Variants in which the metal core is entirely made from a substantially C-shaped profiled section without openings 801, as described as a variant of the embodiment illustrated in FIG. 5, are also conceivable as variants of the bent core of FIGS. 8-10.

Furthermore, the rubber or another elastomeric material can be applied to the metal profiled section 50, 80 in different ways. In addition to extrusion, gluing or vulcanizing an already extruded rubber profiled section onto the insert side 50b, 80b which, in use, faces the pipe is also possible. Coextrusion of an adhesive layer and a rubber layer onto the metal profiled section is also possible. However, the preferred method at this point in time is completely embedding the metal profiled section into the rubber.

The metal profiled section 53, 83 can be produced from a metal strip by punching or the like to form a double comb shape with a central strip from which arms which are at a distance from one another extend outwards in the transverse direction. The ends of the arms 55, 85 which face away from the central strip are bent in order to form an upright part 56, 86, and the ends of the upright parts 56, 86 are bent inwards in order to form gripping projections 57, 87.

In a possible variant embodiment, the gripping projections 57, 87 or gripping edges of the metal reinforcing profiled section can be omitted. In the sectional view from FIG. 13, the metal profiled section is then substantially U-shaped. As a variant of FIG. 13, it is incidentally also possible for the rubber profiled strip into which the metal profiled section is embedded to be U-shaped. If this variant of the vibration-isolating element is fitted in the pipe clip body, the upright parts extend along the edges of the pipe clip body and are preferably arranged in a cliping manner against the edge of the clip body. This prevents the vibration-isolating element from being displaced in the axial direction with respect to the clip body and becoming detached from the clip body, both in the fitted position around a pipe and in the non-fitted position, for example during transport. Generally, the preferred embodiments of FIG. 5 and FIG. 8 are fastened to the clip body more tightly and with less tolerance, but the variant without gripping projections or gripping edges also functions well and can, moreover, be produced and placed in the clip body slightly more easily.

An initially flat vibration-isolating element which is preferably cut to the desired length by machine is produced in the manner described above and is fitted in the clip body or in the clip part. The latter can be carried out by hand, but is preferably done by machine. Thus, it is for example possible to bend the flat metal strip to form a semicircular shape in one single stroke, following which the vibration-isolating element is placed in the clip half, with the upright parts of the vibration-isolating element being placed along the edges of the clip half. In this manner, the clip half and the vibration-isolating element are expediently formed so as to be complementary to one another and coupled to one another. Two clip halves, each of which is provided with a vibration-isolating element, are then coupled together by means of hinge parts.

The vibration-isolating element may, for example, as described above with reference to FIGS. 5-11, already be formed with gripping projections 52, 82 or gripping edges which extend towards one another and which grip around the edges of the metal strip when the metal strip for the clip half is pressed against the vibration-isolating element in the press. However, it is also possible to press a substantially U-shaped profiled section (optionally provided with openings in order to form arms) against the metal strip for the clip half in the press and then bend the free ends of the upright parts towards one another so that the gripping projections are formed after the vibration-isolating element has been fitted in the clip body or the clip part. In the embodiments shown in FIGS. 5-10, the layer of vibration-isolating material is flat on that side of the vibration-isolating element which, in use, faces the pipe. However, it is also conceivable to form longitudinal ridges on this side in order to achieve a better vibration-isolating effect. FIG. 11 shows, by way of example, a cross section of such a profiled section comprising a metal profiled section 110 and a rubber profiled section 111. The undulations 112 in the rubber on the side which faces the pipe during use are clearly visible. It is also conceivable to provide the rubber layer with longitudinal ridges or the like on the side facing the clip body. Other forms of profile are also conceivable.

FIG. 14 shows a variant embodiment in which each edge of a pipe clip body 140 is provided with a separate vibration-isolating element 141 with a metal angled profiled section 142 which is embedded in vibration-isolating material 143. The metal profiled section has a first leg 144 and a second leg 145 and a third leg 146. The vibration-isolating elements 141 can be pushed over the edges of the pipe clip body. The third leg 146 is preferably at an acute angle to the second leg and the first leg is at right angles to the second leg, so that a cliping effect is achieved by means of which the element 141 is retained on the clip body 140. As an alternative to or in combination with the latter, it is also possible to secure the element 141 to the clip body 140, for example by means of glue or the like.

The invention claimed is:

1. Pipe clip comprising an annular pipe clip body made from a metal strip for accommodating a pipe in order to attach the latter to a wall, ceiling or other support, in which vibration-isolating material is applied to the pipe clip body, at least on that side which, in use, faces the pipe, characterized in that on the, viewed in the width direction of the metal strip, outermost regions, a vibration-isolating material is applied to the metal strip, at least on that side which, in use, faces the pipe, and in that a central region of the metal strip situated between the outermost regions lies bare on the side facing the pipe and the side facing away from the pipe.

2. Pipe clip according to claim 1, in which recesses or openings are provided in the metal strip at regular intervals along the length of the outermost regions of the metal strip, which recesses or openings are filled with vibration-isolating material.

3. Pipe clip according to claim 1, in which the outermost regions are coated with vibration-isolating material over their length on the side which faces the pipe during use and on the side which faces away from the pipe.

4. Pipe clip according to claim 2, in which the outermost regions are coated with vibration-isolating material over their length on the side which faces the pipe during use and on the side which faces away from the pipe, and in which the openings are shaped as holes, in which connections made of vibration-isolating material are formed between the layer of vibration-isolating material which is applied to the side facing the pipe during use and the layer of vibration-isolating material which is applied to the side facing away from the pipe, respectively.

5. Pipe clip according to claim 1, in which the vibration-isolating material is bonded to the pipe clip body.

6. Pipe clip according to claim 1, in which outwardly bent tightening flanges are arranged on the ends of the pipe clip body, which tightening flanges can be pulled together during use by means of tightening means in which each of the tightening flanges is free from vibration-isolating material, at least on the side facing the other tightening flange.

7. Pipe clip according to claim 1, in which the vibration-isolating material comprises a coating layer extruded onto the metal strip.

8. Pipe clip according to claim 1, in which the clip body has an outer side, wherein a nut is provided on the outer side of the clip body in the central region.

9. Pipe clip according to claim 1, in which the width of the central region at least corresponds to the largest radial dimension of a nut to be fitted on the clip body.

10. Pipe clip according to claim 1, in which one or more reinforcing ridges are formed in the central region of the pipe clip body.

11. Pipe clip according to claim 1, in which the vibration-isolating material comprises rubber or another elastomeric material.

12. Pipe clip according to claim 3, in which the thickness of the vibration-isolating material on the side facing the pipe during use is greater than the thickness of the vibration-isolating material on the side facing away from the pipe during use.

13. Pipe clip according to claim 1, in which the clip body comprises a plurality of clip parts which are hingedly connected to one another.

14. Metal strip for forming a pipe clip body for accommodating a pipe in order to attach the pipe to a wall, ceiling or other support, the metal strip comprising vibration-isolating material applied to at least on one side of the metal strip which, after the pipe clip body has been formed, faces the pipe during use, wherein on outermost regions on said side as viewed in the width direction of the metal strip, the vibration-isolating material is applied, and a central region of the metal strip situated between the outermost regions is uncoated.

15. Vibration-isolating element to be provided on a pipe clip body of a pipe clip for attaching a pipe to a wall, ceiling or other support, wherein the vibration-isolating element comprises two angled metal reinforcing profiled sections which are located opposite one another and connected to one another, each reinforcing profiled section comprising a first leg which, in the fitted position, extends substantially parallel to the pipe clip body, as well as a second leg wherein, in the fitted position, each of the second legs of the angled profiled sections extends along one of the edges of the clip body, with a vibration-isolating layer being applied to the first leg of the metal reinforcing profiled section, at least on the side which is to face the pipe.

16. Vibration-isolating element according to claim 15, in which the metal reinforcing profiled sections are completely embedded in vibration-isolating material.

17. Vibration-isolating element according to claim 15, in which the angled metal reinforcing profiled sections are connected to one another by vibration-isolating material.

18. Vibration-isolating element according to claim 15, in which the first legs of the metal reinforcing profiled sections are connected to one another via a metal connecting piece.

19. Vibration-isolating element according to claim 18, in which the angled metal reinforcing profiled sections as well as the metal connecting piece are produced in one piece.

20. Vibration-isolating element according to claim 19, in which the angled metal profiled sections and the metal connecting piece together form a substantially U-shaped profiled section.

21. Vibration-isolating element according to claim 15, in which the angled metal profiled section comprises a third leg which extends from the free end of the second leg in substantially the same direction as the first leg in order to grip around the respective edge of the pipe clip body in the fitted position.

22. Vibration-isolating element according to claim 19, in which the angled metal profiled section comprises a third leg which extends from the free end of the second leg in substantially the same direction as the first leg in order to grip around the respective edge of the pipe clip body in the fitted position, and in which the angled metal profiled sections and the metal connecting piece together form a substantially C-shaped profiled section.

23. Vibration-isolating element according to claim 18, in which openings are provided in each of the angled reinforcing profiled sections at a distance from one another along the length thereof, which openings extend from the side towards the centre at a distance from the centre in such a manner that the metal connecting piece forms a central metal strip with arms extending in the transverse direction which are provided with an upright part at the end facing away from the central strip.

24. Vibration-isolating element according to claim 18, in which, in a position prior to fitting to the pipe clip body, the connecting piece is bent upwards in the middle, in such a manner that the second legs of the angled profiled sections are turned slightly outwardly, so that there is a distance between opposite free ends of the two legs, or, if present, inwardly directed third legs, which distance is greater than the width of the pipe clip body, and in such a manner that if the central connecting piece is pressed flat against the pipe clip body during fitting, the second legs swing inwards, as a result of which the second legs retain the pipe clip body in the axial direction and any third legs grip around the side edges of the pipe clip body.

25. Vibration-isolating element according to claim 21, in which the third leg of the angled metal profiled sections extends at an acute angle with respect to the second legs.

26. Vibration-isolating element according to claim 15, in which the vibration-isolating material is extruded onto the metal profiled section.

27. Vibration-isolating element according to claim 15, in which a profiled section of vibration-isolating material is bonded to the angled metal profiled section, at least on the side facing the pipe during use.

28. Vibration-isolating element according to claim 15, in which the metal reinforcing profiled sections are made from a metal strip having a thickness of 0.2-0.8 mm.

29. Pipe clip provided with a vibration-isolating element according to claim 15.

30. A metal strip for forming a pipe clip body for accommodating a pipe in order to attach the latter to a wall, ceiling or other support, wherein on the, viewed in the width direction of the metal strip, outermost regions, a vibration-isolating material is applied to the metal strip, at least on a side which, in use, faces the pipe, and wherein a central region of the metal strip situated between the outermost regions lies bare on the side facing the pipe and the side facing away from the pipe.

31. A metal strip for forming a pipe clip body for accommodating a pipe in order to attach the latter to a wall, ceiling or other support, wherein on the, viewed in the width direction of the metal strip, outermost regions, a vibration-isolating material is applied to the metal strip, at least on a side which, in use, faces the pipe, wherein a central region of the metal strip situated between the outermost regions lies bare on the side facing the pipe and the side facing away from the pipe, wherein furthermore the outermost regions are coated with vibration-isolating material over their length on the side which faces the pipe during use and on the side which faces away from the pipe.

32. A metal strip for forming a pipe clip body for accommodating a pipe in order to attach the latter to a wall, ceiling or other support, wherein on the, viewed in the width direction of the metal strip, outermost regions, a vibration-isolating material is applied to the metal strip, at least on a side which, in use, faces the pipe, wherein a central region of the metal strip situated between the outermost regions lies bare on the side facing the pipe and the side facing away from the pipe, wherein furthermore recesses or openings are provided in the metal strip at regular intervals along the length of the outermost regions of the metal strip, which recesses or openings are filled with vibration-isolating material.

* * * * *